United States Patent
Somanath et al.

(10) Patent No.: US 10,063,840 B2
(45) Date of Patent: Aug. 28, 2018

(54) METHOD AND SYSTEM OF SUB PIXEL ACCURACY 3D MEASUREMENT USING MULTIPLE IMAGES

(71) Applicant: INTEL CORPORATION, Santa Clara, CA (US)

(72) Inventors: Gowri Somanath, Santa Clara, CA (US); Oscar Nestares, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 403 days.

(21) Appl. No.: 14/660,843

(22) Filed: Mar. 17, 2015

(65) Prior Publication Data

US 2016/0188995 A1 Jun. 30, 2016

Related U.S. Application Data

(60) Provisional application No. 62/098,517, filed on Dec. 31, 2014.

(51) Int. Cl.
| | |
|---|---|
| *H04N 13/00* | (2018.01) |
| *H04N 13/02* | (2006.01) |
| *G06K 9/00* | (2006.01) |
| *G06K 9/62* | (2006.01) |

(52) U.S. Cl.
CPC ..... *H04N 13/0242* (2013.01); *G06K 9/00214* (2013.01); *G06K 9/6201* (2013.01); *G06K 2009/6213* (2013.01)

(58) Field of Classification Search
CPC ........... H04N 13/0203; H04N 13/0239; H04N 13/0242; G06T 7/55; G06T 7/593; G06T 7/596; G01B 11/02; G01B 11/022; G01B 11/03; G06K 9/00214; G06K 9/6201; G06K 2209/6213; G06K 2009/6213
USPC ....................................... 382/154
See application file for complete search history.

(56) References Cited

U.S. PATENT DOCUMENTS

| | | | | |
|---|---|---|---|---|
| 2011/0249117 A1* | 10/2011 | Yoshihama | ........ | H04N 13/0239 348/135 |
| 2013/0201210 A1* | 8/2013 | Vaddadi | ................ | G01B 11/25 345/632 |
| 2013/0331145 A1* | 12/2013 | Liao | ........................ | G06T 7/593 455/556.1 |
| 2014/0210950 A1* | 7/2014 | Atanassov | ................ | G06T 7/62 348/47 |
| 2015/0062305 A1* | 3/2015 | Murayama | ........... | G01B 11/043 348/48 |
| 2016/0086322 A1* | 3/2016 | Arita | ...................... | E01B 35/02 382/154 |
| 2016/0292888 A1* | 10/2016 | Arita | ..................... | G01B 11/24 |

OTHER PUBLICATIONS

Gerlach, J. "Least Squares," 2005.*
Kanade, Takeo, and Masatoshi Okutomi. "A stereo matching algorithm with an adaptive window: Theory and experiment." IEEE transactions on pattern analysis and machine intelligence 16.9 (1994): 920-932.*

(Continued)

*Primary Examiner* — Geoffrey E Summers
(74) *Attorney, Agent, or Firm* — Green, Howard, & Mughal LLP.

(57) ABSTRACT

A system, article, and method of sub-pixel accuracy 3D measurement using multiple images.

25 Claims, 11 Drawing Sheets

(56) References Cited

OTHER PUBLICATIONS

Tuytelaars, Tinne, and Luc Van Gool. "Matching widely separated views based on affine invariant regions." International journal of computer vision 59.1 (2004): 61-85.*
Zhou, Yihao, Chen Sun, and Jubing Chen. "Adaptive subset offset for systematic error reduction in incremental digital image correlation." Optics and Lasers in Engineering 55 (2014): 5-11.*
Nestares, et al., "Robust Multi-Resolution Alignment of MRI Brain Volumes", Magnetic Resonance in Medicine 43:705-715 (2000).
International Preliminary Report on Patentability for International Patent Application No. PCT/US2015/062707, dated Jul. 13, 2017.
International Search Report & Written Opinion dated Mar. 4, 2016 for PCT Patent Application No. PCT/US2015/062707.

* cited by examiner

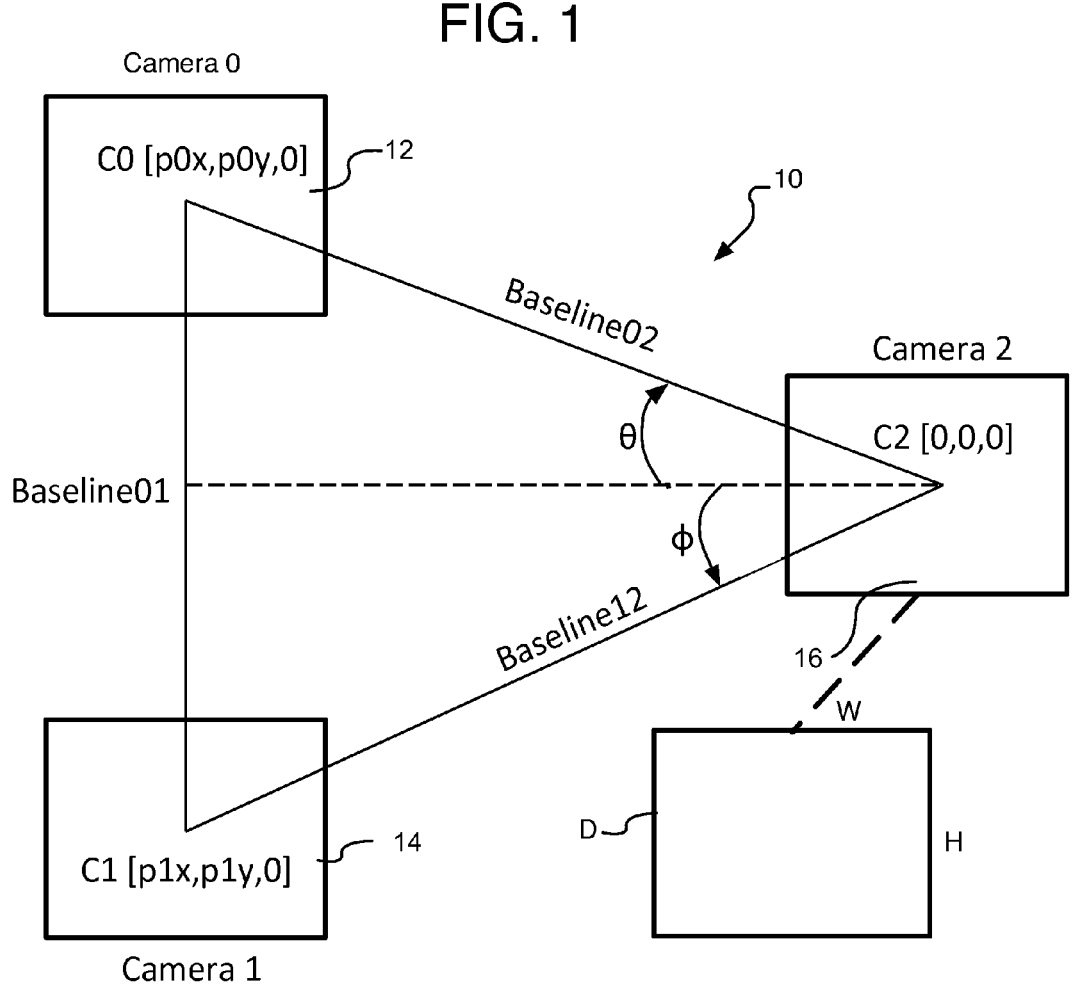

SELECT AT LEAST ONE FIRST POINT TO REFINE TO A 3D SUB-PIXEL ACCURATE LOCATION AND FROM AT LEAST ONE OF MULTIPLE IMAGES OF THE SAME SCENE
202

↓

DETERMINE A REGION OF INTEREST PATCH ON THE ONE IMAGE AND INCLUDING THE FIRST POINT, AND COMPRISING BIASING THE REGION OF INTEREST PATCH TOWARD AT LEAST A SECOND POINT ON THE ONE IMAGE
204

↓

DETERMINE 3D SUB-PIXEL COORDINATES ASSOCIATED WITH THE FIRST POINT BY, AT LEAST IN PART, ALIGNING THE BIASED REGION OF INTEREST PATCH WITH AT LEAST ONE OTHER REGION OF INTEREST PATCH OF A CORRESPONDING POINT THAT MATCHES THE FIRST POINT AND DISPOSED ON ANOTHER OF THE IMAGES
206

METHOD AND SYSTEM OF SUB PIXEL ACCURACY 3D MEASUREMENT USING MULTIPLE IMAGES

CROSS-REFERENCE TO RELATED APPLICATION

This application claims the benefit of U.S. Provisional Application No. 62/098,517, filed Dec. 31, 2014, which is incorporated herein for all purposes.

BACKGROUND

Camera arrays, which may be provided on tablets or smartphones for example, may be provided to capture multiple images of the same scene except from different angles. These images can then be used to generate a 3D space or depth map, and accurately locate objects from the scene and into the 3D space. This is performed so that objects in the scene, or distances between objects in the scene (or from the camera to the object) can be measured, for computer vision, artificial intelligence, object recognition, and otherwise whenever it is desirable to know the size, position, or identity of an object in the scene. For example, one of the applications of 3D camera systems is measurement of distance between points of interest. This could be used to determine the size of furniture, determine the distance an object such as a person or vehicle traveled, or to determine a person's measurements such as their height, to name a few possible examples.

The depth information generated from the camera system is directly used to derive the 3D locations of the points of interest. The distance between these points may be calculated based on camera calibration information and the 3D locations. 3D camera systems can be broadly classified into two types: (1) based on active sensing such as laser scanners, or (2) passive image based systems such as stereo or multi-camera systems. The latter uses two or more images to estimate a disparity map or depth map for the scene that provides values of the disparity in point location from image to image. The estimated disparity is typically limited to integer values which corresponds to even pixel locations. As the distance to an object in a scene is farther from the camera (either to the object from the camera or the size of the object at a far distance), the distance measurement becomes more inaccurate because sub-pixel accuracy (between pixels or partial lengths between pixels) is not available.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 1 is a schematic diagram of images of the same scene and arranged to represent a camera array used to match pixel locations and refine the 3D location of the matching points to a 3D sub-pixel location;

FIG. 2 is a flow chart of sub-pixel accuracy point refinement for 3D measurement;

DETAILED DESCRIPTION

Figure 3:
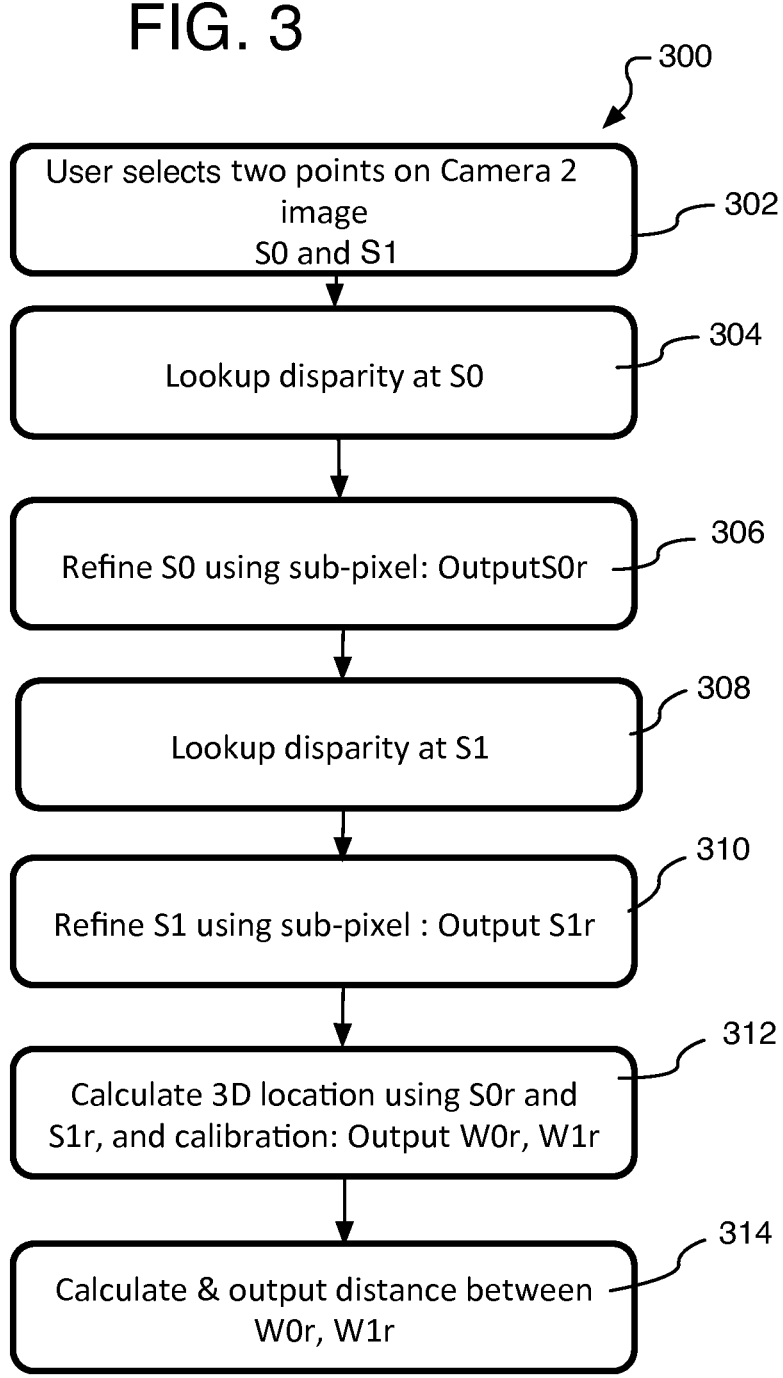
FIG. 3 is a detailed flow chart of sub-pixel accuracy point refinement for 3D measurement.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as imaging devices, digital cameras, smart phones, webcams, video game panels or consoles, set top boxes, tablets with or without multiple cameras, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein also may be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods to provide sub-pixel accuracy 3D measurement using multiple images.

As mentioned above, one of the applications of 3D camera systems with multiple cameras is measurement of distance between points in the scene captured by the images. This may include measuring furniture, a person, or other objects (to determine if it will fit within a certain space for example). The precision of the calculated depth decreases with increasing distance from the camera. In other words, the farther away from the camera an object or distance is located that is being measured, the more real distance is covered between adjacent pixel positions, and the more inaccurate whole pixel value measurement becomes.

The depth information generated from the camera system is directly used to derive the 3D locations of the points of interest. The distance between the points may be calculated depending on the camera calibration information and the 3D locations. 3D camera systems can be broadly classified into two types: (1) those based on active sensing such as laser scanners, and (2) passive image-based systems such as stereo or multi-camera systems. The latter uses two or more images to estimate a disparity or depth map for the scene.

One method used to obtain higher precision 3D measurements uses both image and disparity information. In some 3D camera systems, each image may have an associated disparity map of the difference in pixel location of matching points in two images of the same scene, which is used to obtain the depth for any point in the scene. In other words, the disparity provides correspondence of pixels between the images resulting in a value on a disparity map that is the difference in position from one image to another image. The disparity estimated is typically integer valued to correspond with pixel positions in an image.

A technique is disclosed herein to refine the integer disparity to sub-pixel accuracy thereby increasing the precision of depth measurements. With increased accuracy and precision of 3D locations, the accuracy of measurements of distances between the points is increased. One of the ideas here is to refine the integer disparity to sub-pixel values using the image information. The pixel level correspondence can be further refined using feature matching, sub-pixel image alignment techniques, or by one example, using local gradient-based motion estimation.

By one example used herein, region of interest (ROI) patches are formed at one or both end points to be used for a distance measurement. The ROI patch may be biased along the distance to be measured. The sub-pixel accuracy for the points then may be formed by using alignment or adjustment values that align biased ROI patches from different images and about the end points and corresponding points representing one of the end points for example. The sub-pixel coordinates of the points then may be used to form final disparities, which in turn may be used to form 3D sub-pixel accurate locations associated with the end points and that can be used to measure the distance between the 3D locations.

Referring to FIG. 1, one image capture device 10 may be or have a camera array with three cameras 0, 1, and 2 represented by images 12, 14, and 16 spaced non-linearly or in a triangle. The images also may be referred to herein as images 0, 1, and 2 for convenience. From calibration information, intrinsic and extrinsic information may be obtained for each camera. The intrinsic information includes focal length and principal points (which is the intersection of the optical axis, or axis from the center of the camera sensor, and the image (which may or may not be the exact center of the image)). The extrinsic information provides camera or image centers, and hence baselines extending from center to center of the cameras (or images) when the images are shown in a common plane as in FIG. 1. After rectification that transforms each image into a common plane as shown on FIG. 1, each camera or image basis has the same focal length denoted focal_x and focal_y. Each camera, or image, has a principal point denoted cx_<#> and cy_<#> where # denotes the camera or image number. Here, an image 2 is a reference image with position [0, 0, 0]. The reference image 2 is the image shown to a user for selection of points on the image to initiate distance measurement between the selected points. In one form, these selected points (in 2D whole pixel coordinates) remain fixed throughout the process described herein. It is the 3D coordinates associated with the selected points and of a 3D space location formed by the three images that are actually refined to sub-pixel accuracy. Images 0 and 1, after rectification, have positions C0 and C1 respectively. Baseline<##> indicates the scalar distance between the centers C<#>. As a possible alternative, it will be understood that the three images could be provided by a single camera that provides multiple images from known fixed positions. The description herein, however, mainly will be provided in terms of images from a multi-camera array where each image is from a respective camera.

The rectified images and disparity may be designated dimensions W×H pixels. A disparity map D defines correspondence between pixels of two rectified images. For example, in the camera system shown in FIG. 1, the disparity map D includes a disparity value for each pixel of the reference camera (camera 2). This disparity value indicates correspondence from each pixel of the image from camera 2 to the image of the camera 0 or 1 based on the longer baseline. For the illustrated non-limiting example, it is assumed that baseline 02 from camera 2 to camera 0 has the longer baseline for the operations and calculations described below.

Referring to FIG. 2, process 200 is provided for a method and system of sub-pixel accuracy 3D measurement using multiple images. In the illustrated implementation, process 200 may include one or more operations, functions or actions 202 to 206 numbered evenly. By way of non-limiting example, process 200 may be described herein with reference to example image capture array 10 of FIG. 1 and/or image processing system 900 of FIG. 9, and where relevant.

Process 200 may include "select at least one first point to refine to a 3D sub-pixel accurate location and from at least one of multiple images of the same scene" 202, and by one example, may be provided for the camera array 10 (FIG. 1) such that the same objects are shown in multiple images except from different angles by the example. The first point may be one of two points selected on one of the images either manually by a user or automatically by the system to measure the distance between the two points.

The process 200 also may include "determine a region of interest patch on the one image and including the first point, and comprising biasing the region of interest patch toward at least a second point on the one image" 204. Specifically, a region of interest patch may be set for one or more points. The patch may include other points on the image near to the point being refined. Also, the point need not be in the center of the patch, and by one form, the patch is biased (where a patch boundary is closer to) at least a second point on the image, such that the desired distance measurement is from the first point to the second point. By one example, it is desirable to determine a sub-pixel accurate distance between the first point to be refined and the second point. By one form, both points are refined to sub-pixel accuracy, and both points have corresponding points on the other images and with their own biased ROI patches. The boundaries for the biased ROI patches are determined by using a number of parameters as explained below with process 400.

Once the patches are set, the process 200 also may include "determine 3D sub-pixel coordinates associated with the first point by, at least in part, aligning the biased region of interest patch with at least one other region of interest patch of a corresponding point that matches the first point and disposed on another of the images" 206. This operation may include aligning a patch from another of the multiple images and around a point that corresponds to the first point to be refined to a sub-pixel 3D location. The corresponding points may be found by using the original whole-pixel value-based disparities. The alignment or adjustment values then may be used to determine new sub-pixel accurate coordinates for the corresponding points. These new sub-pixel accurate points may be used to compute final sub-pixel-accurate 3D coordinates to be used for measurement.

Thus, it will be understood that refinement has different meanings depending on the context. While the corresponding 2D (x and y coordinate) whole pixel points on images 0 and 1 for this example may be refined to 2D sub-pixel accurate points, in contrast the first point (the selected point as the end point of a distance to be measured on image 2) is refined by ultimately generating sub-pixel accurate 3D points or locations in a 3D space cooperatively formed by the multiple images of the same scene. This latter relationship may be described as the first point being refined to a sub-pixel accurate 3D location. These 3D locations are then used to measure the distance between them.

One form of the sub-pixel refinement process may be recited as follows:

(1) Let I0, I1 and I2 represent the three input rectified images 12, 14, and 16 for example from FIG. 1, (2) For a point to be refined on one image, using the disparity, find the corresponding points in the other images.

(3) Determine a small Region of Interest (ROI) (or patch) around the point, (4) Apply a local image alignment technique to the patches (for a total of 3 patches from 3 images), (5) Determine two new pairs of sub-pixel disparity from the above, and (6) Select the final disparity and use it to obtain the 3D location of the point.

Referring to FIG. 3, in more detail, a process 300 is provided for a method and system of sub-pixel accuracy 3D measurement using multiple images. In the illustrated implementation, process 300 may include one or more operations, functions or actions 302 to 314 numbered evenly. By way of non-limiting example, process 300 may be described herein with reference to example image capture array 10 of FIG. 1 and/or image processing system 900 of FIG. 9, and where relevant.

Figure 5:
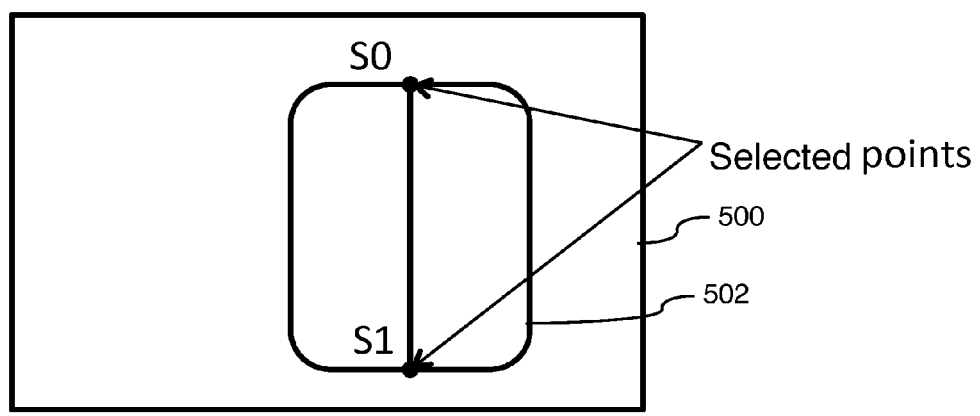
FIG. 5 is a diagram for indicating points to be refined to sub-pixel accuracy for a distance to be measured.

Process 300 may include "user selects two points on camera image S0 and S1" 302, and as shown on FIG. 5. This indicates the distance between these points are to be measured, and that the points are to be refined for sub-pixel accuracy. The points are considered to be selected on reference image 2.

Process 300 may include "look up disparity at S0" 304, and particularly the disparity in position of the same point from image to image for S0. The disparity may be used to find the whole pixel coordinates of the point on the image that corresponds to the first point S0.

Process 300 may include "refine S0 using sub-pixel: Output S0r" 306, and as explained herein, by aligning ROI patches from different images and around matching or corresponding points (here S0 and its matching point) to obtain new sub-pixel accurate corresponding point coordinates which is S0r. The boundaries of the ROI patches are set so that the ROI patches are biased toward the other point on the same image that defines the distance to be measured. Adjustment values can be determined that align the ROI patches of corresponding points, and these adjustment values can then be used to compute the sub-pixel accurate S0r coordinates.

Process 300 may include "look up disparity at S1" 308, and particularly the disparities in position of the same point from image to image as with S0. Thus, each point to be refined, where the distance is to be measured between the points, has the refinement to sub-pixel accuracy computed separately.

Process 300 may include "refine S1 using sub-pixel: OutputS1r" 310, and as with the computation of S0r to determine S1r.

Process 300 may include "calculate 3D location using Output S0r and S1r (the sub-pixel accurate coordinates), and calibration: Output W0r, W1r." 312. This operation determines a final sub-pixel disparity for each point, and then uses the final sub-pixel disparity to compute final 3D coordinates for the points being refined.

Process 300 may include "calculate and output distance between W0r, W1r" 314, which is the desired sub-pixel-accurate distance.

Figure 4A:
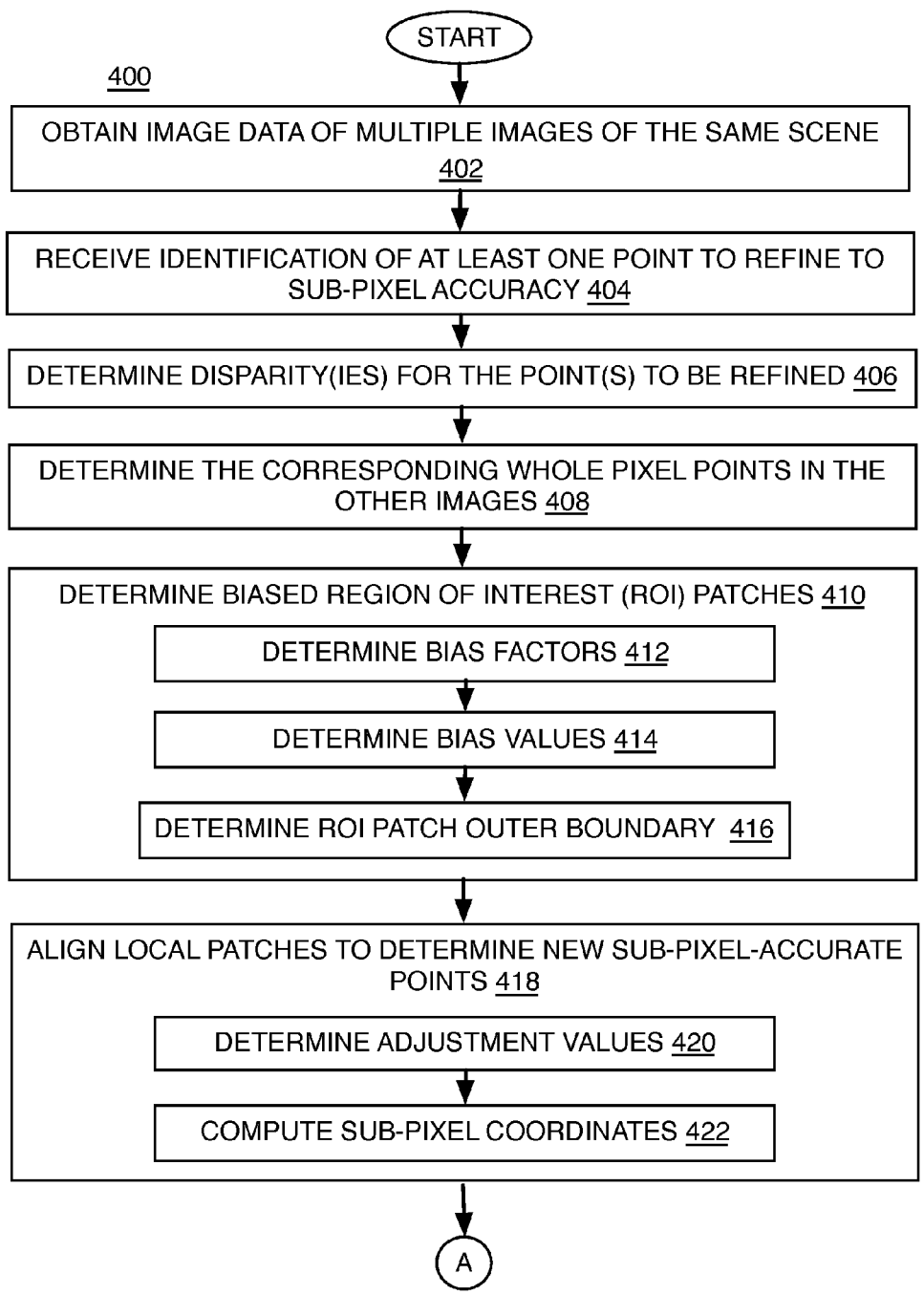
FIGS. 4A-4B is another detailed flow chart of sub-pixel accuracy point refinement for 3D measurement.
Figure 4B:
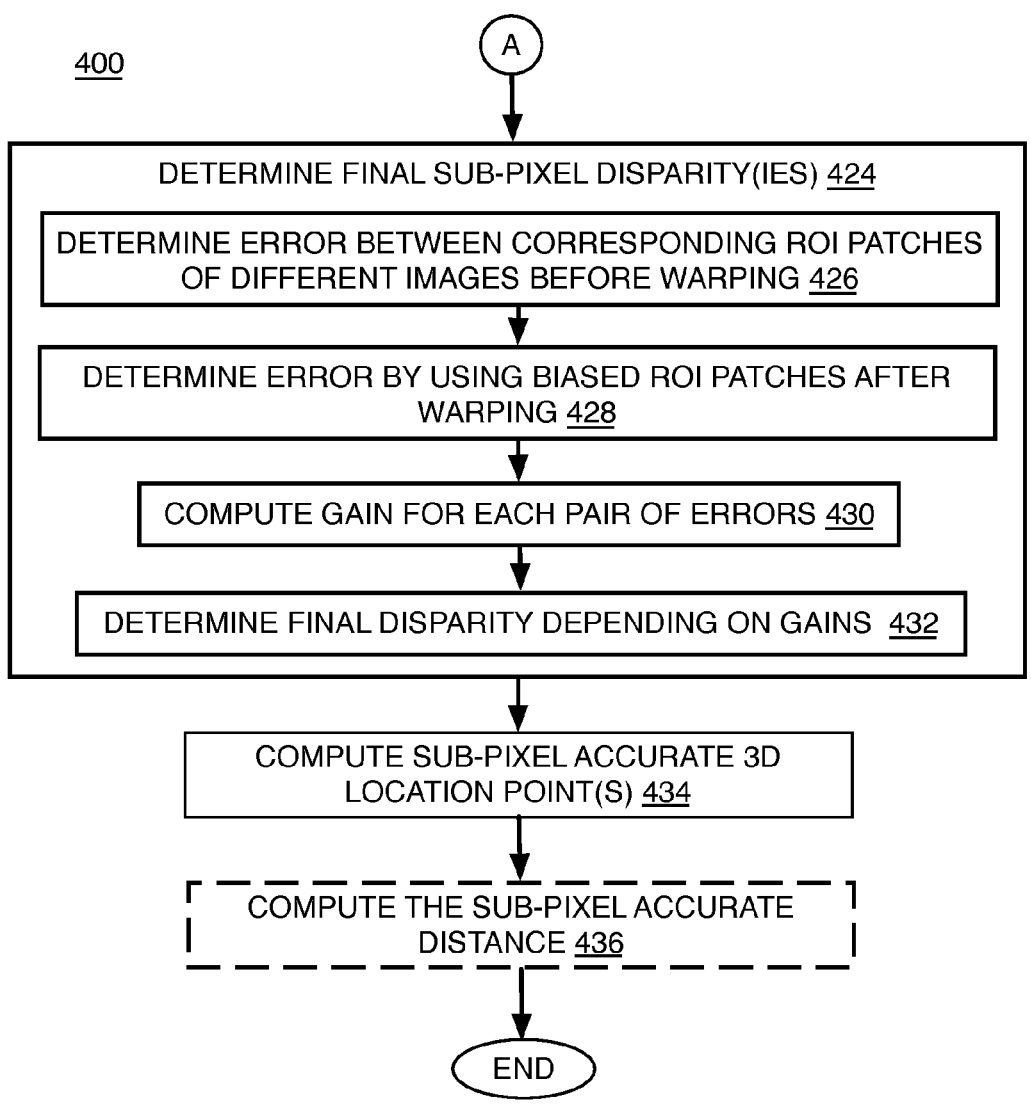

Referring to FIGS. 4A-4B, in even more detail, a process 400 is provided for a method and system of sub-pixel accuracy 3D measurement for multiple images. In the illustrated implementation, process 400 may include one or more operations, functions or actions 402 to 436 numbered evenly. By way of non-limiting example, process 400 may be described herein with reference to example image capture array 10 of FIG. 1 and/or image processing system 900 of FIG. 9, and where relevant.

Process 400 may include "obtain image data of multiple images of the same scene" 402. As with process 200, this may include obtaining data from a camera array, and by one example a tablet or other computer device with multiple cameras. The cameras may be arranged in a triangle or other arrangement. This operation may include any pre-processing of the images and rectification of the images to a common plane.

The process 400 then may include "receive identification of at least one point to refine to sub-pixel accuracy" 404. Specifically, by one example, a user may be shown one of the images, which may be a reference image, and from multiple images taken by the camera array and of the same scene or objects, and in one form from different angles. Thus, as shown in FIG. 5, the user may select or click on a first and second point S0 and S1 that are at the ends of an object 502 on image 500 to obtain the distance along the line S0-S1 between them. By other alternatives, the second point S1 may be automatically chosen or fixed, and the user only selects one point. By yet other alternatives, an application (or actually a computer, tablet, camera, or other device performing the application) may automatically select one or more points that are to be refined to sub-pixel accuracy for distance measurements or other purposes for example.

It also will be understood that normally both points which are the end points of a distance to be measured will be refined to sub-pixel accuracy but that the processes herein could be used to adjust only one of the points if that was desired.

Process 400 then may proceed with "determine disparity(ies) for the point(s) to be refined" 406. For any point P(x2, y2) selected for refinement in the camera 2 image 16 for example, there is a corresponding disparity D(x2, y2)=d to a corresponding point in another image (which may or may not be from another camera) such as image 12 or 16, and of the same scene. d here is in whole pixel value. The 3D location, [X Y Z], of this point may be calculated as $$Z=(focal\_x * baseline02)/d \quad (1)$$

$$X=(x2-cx\_2)*Z/focal\_x \quad (2)$$

$$Y=(y2-cy\_2)*Z/focal\_y \quad (3)$$

where these variables are already defined above. The sub-pixel refinement method herein refines the disparity d as described in the following sections. The final sub-pixel-accurate distance measurement is the distance between 3D sub-pixel accurate locations associated with the two selected points and computed by using a modified, final d as explained below.

At this point in the process 400, however, disparity d is based on the whole pixel value, and is used to determine the coordinates of the points in the images 0 and 1 that correspond to the points S0 and S1 in image 2 to be refined. Here, let S0_2(x2_0, y2_0) and S1_2(x2_1, y2_1) be the two points to refine in the camera 2 image. Also, let d0 and d1 be their corresponding disparity values. The disparities d0 and d1 can be obtained by looking up the values on the disparity map D at (x2_#, y2_#) where # is the image number, or by calculating some combination value by taking a mean or median of disparity values in a small radial region around the points on the disparity map D. Many examples are contemplated and as long as coordinates of a point in the other images (0 or 1) can be found to correspond to the S0 and S1 points in the image 2.

Process 400 then may include "determine the corresponding whole pixel points in the other images" 408. In this example, this may be accomplished for camera 0 and camera 1 by using the following equations that use the found disparities d where:

$$S\#\_0=[x2\_\#+d\#*\cos(\theta), y2\_\#+d\#*\sin(\theta)] \text{ for image 0} \quad (4)$$

$$S\#\_1=[x2\_\#+d\#*\cos(\Phi), y2\_\#+d\#*\sin(\Phi)] \text{ for image 1} \quad (5)$$

where the angles are depicted in FIG. 1, and are derived from camera calibration information, and # indicates correspondence to either point number (S0 or S1).

The following operations are performed for sub-pixel refinement for each point, and are denoted generally as subroutine sub-pixel-refinement (P2, P2b) where P2 is the point being refined (here it is first assumed to be S0), and P2b is the other point being used for measurement of the distance between the points (here first assumed to be S1). Thus, the subroutine also is invoked specifically here as sub-pixel-refinement (S0_2, S1_2) to obtain refinement of S0_2, and then as sub-pixel-refinement (S1_2, S0_2) to obtain refinement of S1_2.

So for sub-pixel refinement process (P2, P2b), let P2(x2, y2) be the point being refined and P2b(x2b, y2b) the other point used for measurement. Using equations (4) and (5), the process obtains P0(x0, y0) and P1(x1, y1) which are the corresponding points in images 12 and 16 of camera 0 and camera 1, and are the whole pixel value points.

Figure 6:
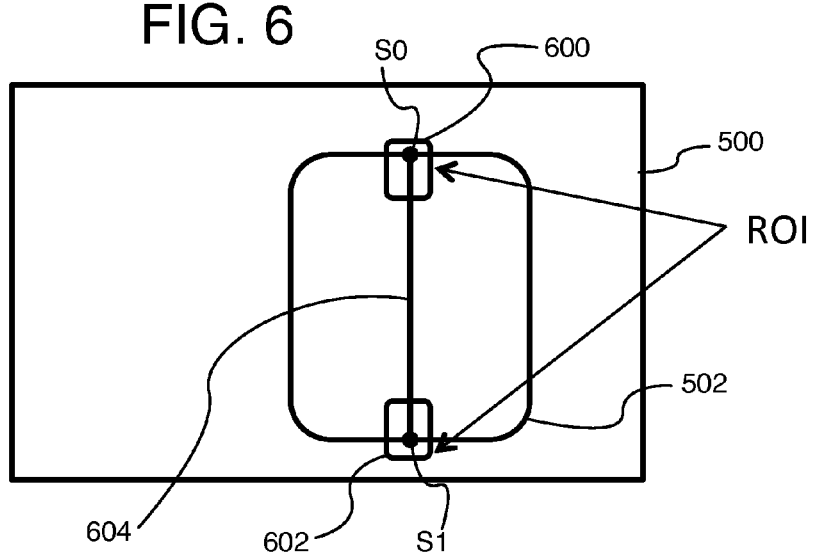
FIG. 6 is a diagram of biased region of interest patches used for sub-pixel refinement of a distance to be measured.
Figure 7:
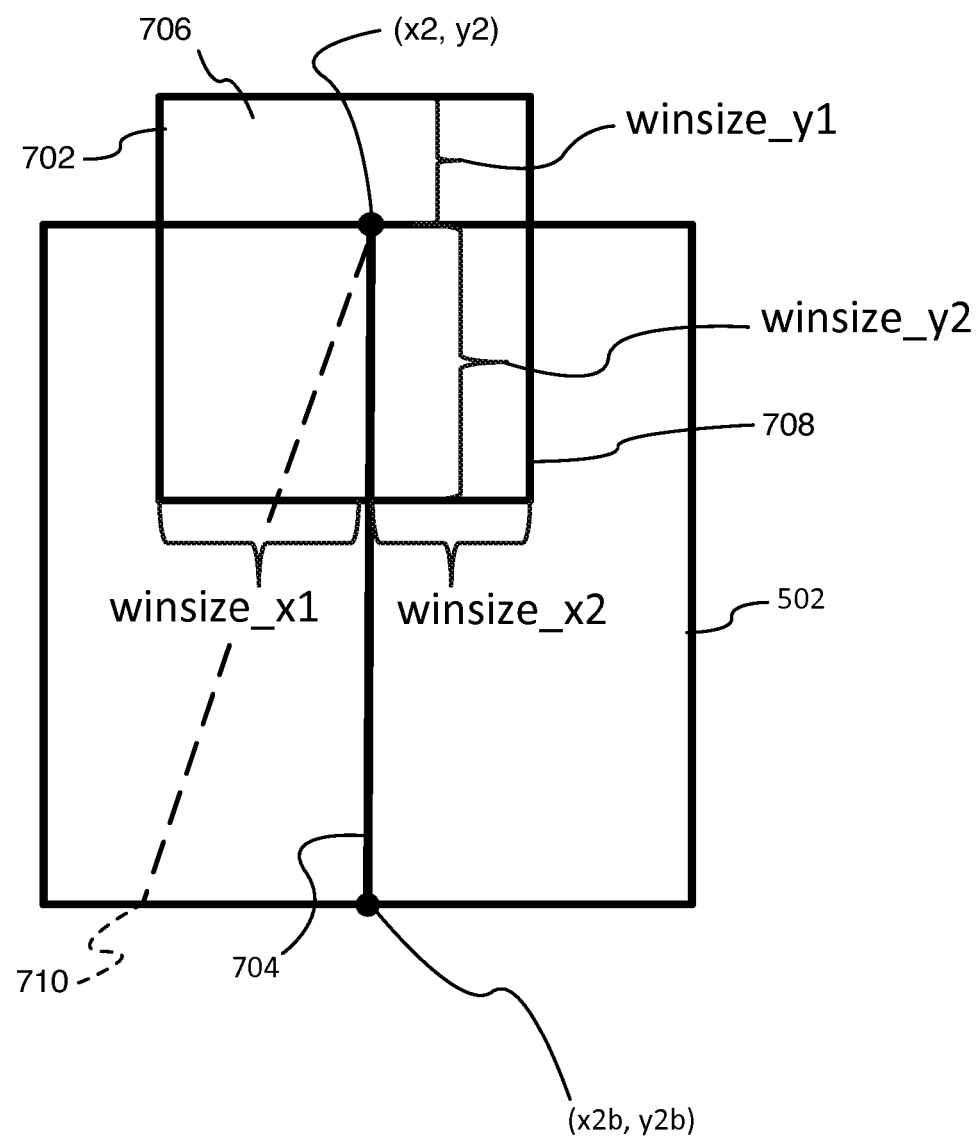
FIG. 7 is a diagram of a biased region of interest patch around a point to be refined to sub-pixel accuracy.

Referring to FIGS. 6-7, process 400 may include "determine biased region of interest (ROI) patches" 410. Though each point is refined separately, the ROI patch is biased based on the other point(s) to be refined (or other selected significant point) as shown in FIG. 7. The bias is such that the rectangular ROI patch 600 or 602 on an image 500 has more pixels along the straight line 604 or 704 joining the two points (which has a length that is the distance being calculated) than on the opposite side 706 of the second point (x2b, y2b), and away from the line. Thus, it can be stated that the ROI patch 702 (FIG. 7) is biased toward another point on the image.

The ROI patch around each of P2, P0, and P1 is determined by winsize_x1 and winsize_x2 which are the horizontal dimensions of the patch, and winsize_y1 and winsize_y2 which are the vertical dimensions of the patch as shown in FIG. 7, and each is a dimension or distance from the point (x#, y#) being refined (or its corresponding point) to one of the edges of the ROI patch. When the distance between the points is not perfectly vertical or horizontal such that it is diagonal, the bias may be in both a vertical and horizontal direction. This is exemplified by the ROI patch 702 (FIG. 7) being biased downward and to the left (since winsize_x1 is greater than winsize_x2, and winsize_y2 is greater than winsize_y1) to show this (even though the distance line 704 is vertical, it should actually be diagonal downward to the left (as shown by dashed line to second point 710) to match the horizontal example bias (winsize_x1 > winsize_x2) of the ROI patch 702. It should be noted that the dimensions are to the point to be refined (S0 or x2, y2 here) rather than the distance line 704 or boundary of the object 502. It will also be understood that the patch 702 maintains horizontal and vertical outer boundaries 706 even though the distance line 704 may be diagonal for this example. In other forms, the patch could be rotated along with the rotation of the distance line.

This operation includes "determine bias_factor(s)" 412, and particularly, a bias factor for each possible direction of the bias (here x and y for example and as just explained above). The bias factor is based on the ratio of the distance 704 between the two refinement points (or end points of the distance or length to be measured) and the size of the image 0, 1, or 2. Specifically, the bias factors are generated as follows:

$$bias\_factor\_x=1-[abs(x2b-x2)/W] \quad (6)$$

$$bias\_factor\_y=1-[abs(y2b-y2)/H] \quad (7)$$

where W and H are the horizontal and vertical image size in pixels, (x2, y2) are the point coordinates of the point to be refined, and the (x2b, y2b) are the coordinates of the second point to be measured to (as shown in FIG. 7). Thus, equation (6) is a ratio of the horizontal component of the distance to be measured compared to the width of the image, and equation (7) is the vertical component of the distance to be measured compared to the height of the image. The bias factor is then the remaining portion of the image after subtracting out the ratio, and for each direction x and y.

The next task in the operation to determine the biased ROI patch is to "determine bias values" 414. The bias value is based on a default radius of the ROI patch, and a threshold value that changes the bias value depending on whether the distance is close to vertical, close to horizontal or diagonal. A default radius w=DEFAULT_RADIUS is a scalar radius parameter. Default_radius is the radius of a patch around which disparity is used (or in other words, the radius of a typical patch that is used for disparity measurement in conventional patch-based disparity computation and feature matching for example, which is set at 10 pixels by one example. This is dependent on image resolution, and may be found from experimentation.

Also, a threshold MIN_THR is a preset scalar in pixels, and is a threshold for the difference in x and y coordinates. It is an indication of how the line (for example, the line of the distance to be measured) joining the points is orientated such as whether the lines are close to horizontal or vertical. It is 5 pixels in one example. Example pseudo code may be provided to determine bias values based on the bias factors, the threshold, and radius w for the patch as follows:

```
If (x2b - x2) > MIN_THR, then
{
bias_x1 = w * bias_factor_x
bias_x2 = w + w*(1 - bias_factor_x)
}
Else
{
bias_x2 = w * bias_factor_x
bias_x1 = w + w*(1 - bias_factor_x)
}
```

A similar computation is performed to determine bias_y1 and bias_y2. Note that when the distance is not diagonal, there is no bias in the opposite direction of the distance line. Thus, for a perfectly vertical line, (x2b−x2=0), then bias_factor_x is 1, and both bias values bias_x1 and bias_x2=w (there is no bias in the x or horizontal direction). The similar elimination of bias in one of the directions could equally apply when a completely horizontal line is present.

Next, process 400 may include "determine ROI patch outer boundary" 416. This includes determining the winsize values as follows:

$$\text{winsize\_}x1 = \text{bias\_}x1 * \text{WIN\_SCALE} + 4, \tag{8}$$

$$\text{winsize\_}y1 = \text{bias\_}y1 * \text{WIN\_SCALE} * 4. \tag{9}$$

where WIN_SCALE is a parameter that controls the shape and maximum size of the ROI patch. The larger the WIN_SCALE, the larger the patch, and established by experimentation on a trial and error basis. Where w=10, and MIN_THR=5, WIN_SCALE has found to be adequate at 10. This computation is similar for winsize_x2 and winsize_y2.

One alternative task is to check to ensure that the patch, which may be set to be the same size for a point on all of the images, does not extend beyond the image boundaries of any of the images, and by the following computations:

$$\text{winsize\_}x1 = \min(x0, x1, x2) \tag{10}$$

$$\text{winsize\_}x2 = \min(\text{winszie\_}x2, W - \max(x0, x1, x2)) \tag{11}$$

$$\text{winsize\_}y1 = \min(y0, y1, y2) \tag{12}$$

$$\text{winsize\_}y2 = \min(\text{winsize\_}y2, W - \max(y0, y1, y2)) \tag{13}$$

where the corresponding whole-pixel value points being refined are (x0, y0) (x1, y1) and (x2, y2) as described above, and the winsize dimensions are set to those computed for the min or max values of the points as shown in equations 10-13.

Using the above equations, patches patch0, patch1, and patch2 on images 0, 1, and 2 (or 12, 14, and 16 from FIG. 1) respectively are generated for the three images as follows:

$$\text{Patch0} = I0[x0 - \text{winsize\_}x1 : x0 + \text{winsize\_}x2, y0 - \text{winsize\_}y1 : y0 + \text{winsize\_}y2] \tag{14}$$

This provides the starting and ending pixel location of the biased ROI patch. For example, I0[2:7, 3:8] refers to, and starting with 0, 0 in the upper left corner of the image, that the biased ROI patch extends horizontally from pixel column 2 to the right to column 7, and vertically from pixel row 3 down to row 8. This format is similar for patch 1 from I1 around (x1, y1), and patch 2 from I2 around (x2, y2).

Process 400 also includes "align local patches to determine new sub-pixel-accurate points" 418. For this operation, once the patches are established, the process uses multiple known techniques to estimate sub-pixel alignment between each pair. In other words, process 400 includes "determine adjustment values" 420 that are the difference between a biased ROI patch of the first point to be refined on one image and another ROI patch, which also may be biased, of a corresponding point on another image. Examples of such processes that align non-biased patches that can be used here include optical flow, and detecting features such as scale invariant feature transform (SIFT) for sub-pixel localization. In one example, patches are matched based on the intensity/gradient information. In this example implementation, the method for aligning the patches is provided by Nestares, O. and Heeger, D. J. (2000), Robust multiresolution alignment of MRI brain volumes. Magn Reson Med, 43: 705-715. The method provides a scale (Z direction parallel to the optical axis) and x and y shift displacement (parallel to the surface of the camera sensor and image) to properly align the patches.

The matching of two patches on two different images provides an affine transformation defined as scale factor and shift displacement in x and y dimensions. This transform defines a new location for the patch from image 0 or 1 such that it provides a better match to the reference patch from image 2.

Once the adjustment values are obtained for the comparison of two patches on two images, process 400 may include "compute sub-pixel coordinates" 422, and of the corresponding point(s) being refined by this example. By one example form, the process 400 estimates transforms A02, A12 from a transform matrix between patche0-patch2, patch1-patch2, respectively. An example is shown as follows:

Each transform is a 2×3 matrix of the form:

$$A = \begin{bmatrix} \text{scale\_x} & 0 & \text{shift\_x} \\ 0 & \text{scale\_y} & \text{shift\_y} \end{bmatrix} \tag{15}$$

to be read as A[0][0]=scale_x, while A[0][2]=shift_x, and so on.

Figure 8:
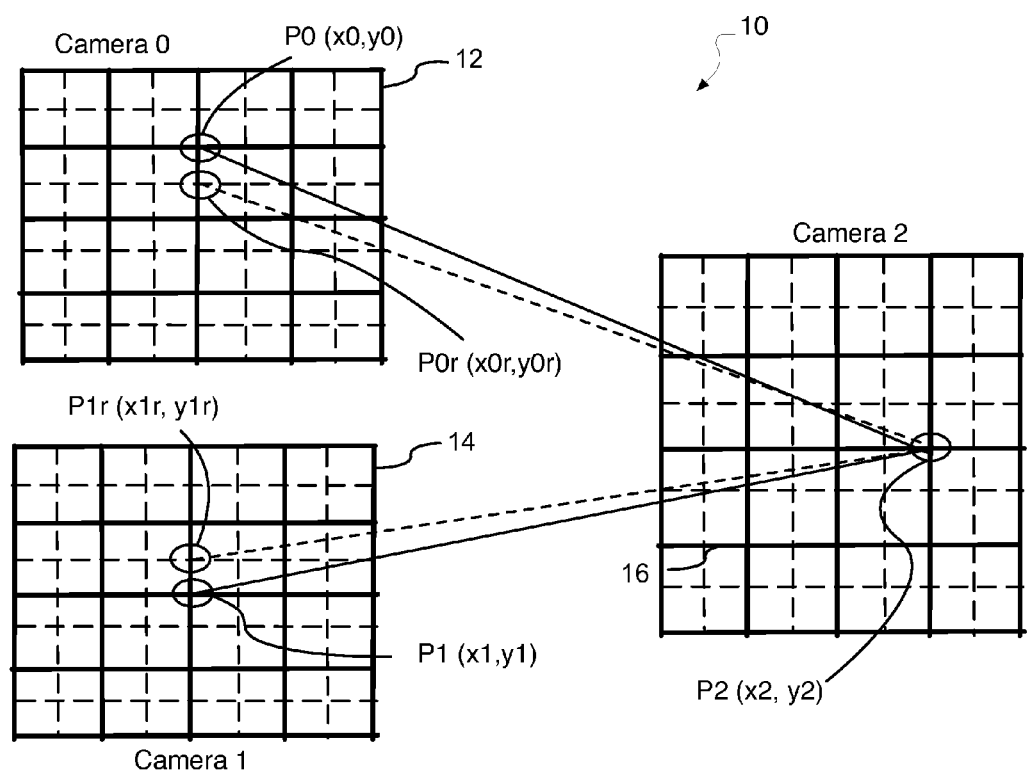
FIG. 8 is a schematic diagram of images of the same scene used to match pixel locations and refine the location to a sub-pixel location.

Using the transforms, the new locations for P0 and P1 is as follows and as shown in FIG. 8:

$$x0r = A02[0][0]*\text{winsize\_}x1 + A02[0][2] + x0 - \text{winsize\_}x1 \quad (16)$$

$$y0r = A02[1][1]*\text{winsize\_}y1 + A02[1][2] + y0 - \text{winsize\_}y1 \quad (17)$$

$$x1r = A12[0][0]*\text{winsize\_}x1 + A12[0][2] + x1 - \text{winsize\_}x1 \quad (18)$$

$$y1r = A12[1][1]*\text{winsize\_}y1 + A12[1][2] + y1 - \text{winsize\_}y1 \quad (19)$$

Referring to FIG. 8, the localization is shown on images 12, 14, and 16 where the thick-lined grid indicates the integer pixel grid of the image. Through the sub-pixel refinement process, new sub-pixel accurate locations P0r and P1r are obtained for the points, which falls at non-integer locations as depicted by the dashed, thin lined grid and dashed baselines. By other alternatives, models such as pure displacement, projective transformation may be used to find the new patch locations.

Process 400 includes "determine final sub-pixel disparity(ies)" 424. Thus, each of the above new sub-pixel-accurate corresponding point (x0r, y0r) and (x1r, y1r) induces a disparity along baseline02 and baseline12 respectively. To calculate the final 3D locations, however, first a final sub-pixel accurate disparity is computed as follows.

This operation includes "determine error between corresponding ROI patches of different images before warping" 426, and "determine error by using biased ROI patch after warping" 428. Particularly, the final disparity may depend on an error and gain calculation. This includes calculating error_before02 as the sum of absolute difference (SAD) between patch0 and patch2 for example, as well as error_before12 between patch1 and patch2. Instead of SAD, many other computations that combine the pixel values in the patch into a single or other representation to compare patches may be used.

Then patch0 is warped to patch0warped based on A02 and affine mapping, where warping is performed by applying the estimated scale and shift to the patch0. It is 'affine' by definition because only one scale and 2 shift parameters exist. This essentially allows the process to bring one patch to overlay another, and to make pixel to pixel comparisons. The same computation is performed for biasing patch1 to patch1warped based on A12.

The process then obtains patch0warped and calculates Sum of Absolute Differences (SAD) error_after02 between patch2 and patch0warped. A similar computation is performed to calculate error_after12 for patch1warped and patch2.

Process 400 then may include "compute gain for each pair of errors" 430. Thus, once the error values are computed, the error values are used to calculate gains as follows:

$$\text{gain02} = \text{error\_after02} - \text{error\_before02}, \quad (20)$$

$$\text{gain12} = \text{error\_after12} - \text{error\_before12} \quad (21)$$

Process 400 then may include "determine final disparity depending on gains" 432, and which is performed as follows:

If gain02>gain12, 02 is selected as the pair providing the disparity as follows:

$$\text{final\_disparity} = \text{sqrt}[(x2-x0r)^2 + (y2-y0r)^2]$$

$$\text{final\_baseline} = \text{baseline02} \quad (22)$$

else $$\text{final\_disparity} = \text{sqrt}[(x2-x1r)^2 + (y2-y1r)^2]$$

$$\text{final\_baseline} = \text{baseline12} \quad (23)$$

Process 400 includes "compute sub-pixel accurate 3D location point(s)" 434, and particularly, the sub-pixel 3D location for input point P2(x2, y2) is calculated using Equations (1) to (3) set above where:

$$Z = \text{focal\_}x * \text{final\_baseline} / \text{final\_disparity} \quad (24)$$

These final 3D coordinates or locations then may be used by an application to "compute the sub-pixel accurate distance" 436, and between the points on the image by one example, and that correspond to the whole or integer pixel points (S0 and S1 for example). It will be understood that instead of computing a distance between the two points, the sub-pixel accurate coordinates may now be used by other applications, such as sub-pixel disparity map computation, feature correspondence for 3D point cloud reconstruction, object identification, computer vision, artificial intelligence, and so forth. In addition, any one or more of the operations of FIGS. 2-4 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 9:
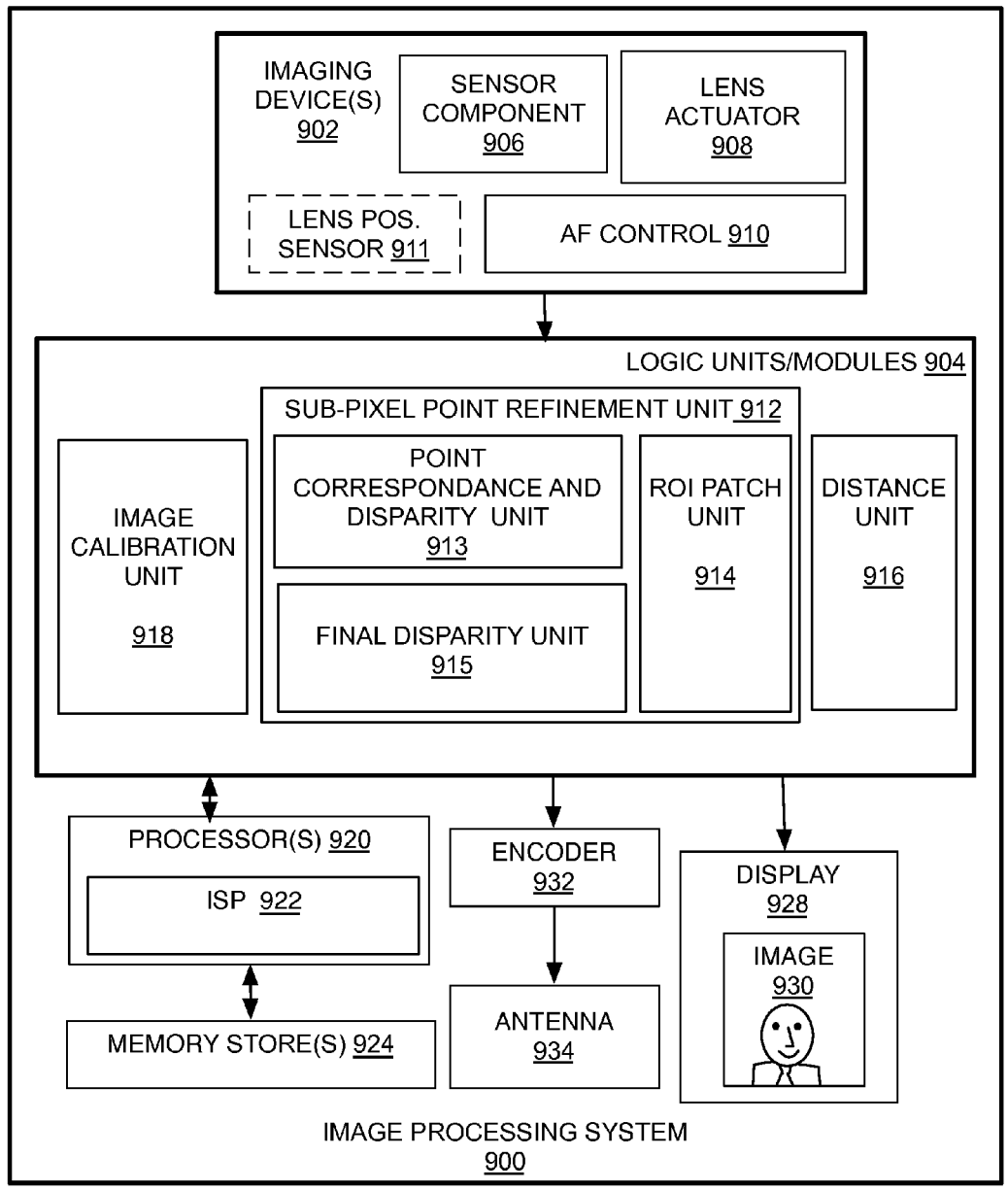
FIG. 9 is an illustrative diagram of an example system.

Referring to FIG. 9, an example image processing system 900 is arranged in accordance with at least some implementations of the present disclosure. In various implementations, the example image processing system 900 may have an imaging device 902 to form or receive captured image data. This can be implemented in various ways. Thus, in one form, the image processing system 900 may be one or more digital cameras or other image capture devices, and imaging device 902, in this case, may be the camera hardware and camera sensor software, module, or component of the image processing system 900. In other examples, imaging processing system 900 may have an imaging device 902 that includes or may be one or more cameras, and logic modules 904 may communicate remotely with, or otherwise may be communicatively coupled to, the imaging device 902 for further processing of the image data.

Thus, image processing device 900 may be a single camera on a multi-camera device such as a smartphone, tablet, laptop, or other mobile device. Otherwise, device 900 may be the tablet or other device with multiple cameras where the processing occurs at one of the cameras or at a separate processing location communicating with the cameras whether on or off of the tablet or other device, and whether the processing is performed at a mobile device or not.

In either case, such technology may include a camera such as a digital camera system, a dedicated camera device, or an imaging phone or tablet, whether providing a still picture or video camera or some combination of both. Thus, in one form, imaging device 902 may include camera hardware and optics including one or more sensors as well as auto-focus, zoom, aperture, ND-filter, auto-exposure, flash, and actuator controls. These controls may be part of a sensor module or component 906 for operating the sensor. The sensor component 906 may be part of the imaging device 902, or may be part of the logical modules 904 or both. Such sensor component can be used to generate images for a viewfinder or viewscreen and provide live images or take still pictures or video. The imaging device 902 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. The camera sensor may also support other types of electronic shutters, such as global shutter in addition to, or instead of, rolling shutter, and many other shutter types. In other examples, an RGB-Depth camera and/or microphone-array might be used in addition to or in the alternative to a camera sensor. In some examples, imaging device 902 may be provided with an eye tracking camera.

The imaging device 902 also may have a lens actuator 908 that has a lens and a lens driver or driver logic that receives commands to move the lens and applies an electrical current to move the lens. Optionally, the imaging device 902 also may have an autofocus control 910 and a lens position sensor 911 to confirm lens positions if needed.

In the illustrated example, the logic modules 904 may include a sub-pixel point refinement unit 912 that receives modified image data from a calibration and/or rectification unit 918. The refinement unit 912 includes point correspondence and disparity unit 913 that computes the disparities between images and point correspondence for the refinement operations. The refinement unit 912 also has an ROI patch unit 914 to locate, size, bias, and align patches at the points being refined to determine the sub-pixel-accurate point coordinates as described in the operations above. Also, the refinement unit 912 has a final disparity unit 915 for computing a final disparity based on the sub-pixel accurate point coordinates and to form final sub-pixel 3D location coordinates for the points. A distance unit 916 may or may not be part of the refinement unit 912 and is provided to compute the distances between the final 3D locations for many different applications.

Any combination of the units of the logic modules 904 may be operated by, or even entirely or partially located at, processor(s) 920, and which may include an ISP 922. The logic modules 904 may be communicatively coupled to the components of the imaging device 902 in order to receive raw image data which is then calibrated, and so forth. Optionally, certain feature point data may be provided by a data stream separate from the raw image data stream. In these cases, it is assumed the logic modules 904 are considered to be separate from the imaging device. This need not be so, and the logic modules very well may be considered to be part of the imaging device as well.

The image processing system 900 may have one or more processors 920 which may include a dedicated image signal processor (ISP) 922 such as the Intel Atom, memory stores 924 which may or may not hold data relevant to the operations mentioned herein, one or more displays 928 to provide images 930, and which may be a viewscreen on the device, encoder 932, and antenna 934. In one example implementation, the image processing system 100 may have the display 928, at least one processor 920 communicatively coupled to the display, and at least one memory 924 communicatively coupled to the processor. The encoder 932 and antenna 934 may be provided to compress the modified image data for transmission to other devices that may display or store the image. It will be understood that the image processing system 900 may also include a decoder (or encoder 932 may include a decoder) to receive and decode image data for processing by the system 900. Otherwise, the processed image 930 may be displayed on display 928 or stored in memory 924. As illustrated, any of these components may be capable of communication with one another and/or communication with portions of logic modules 904 and/or imaging device 902. Thus, processors 920 may be communicatively coupled to both the image device 902 and the logic modules 904 for operating those components. By one approach, although image processing system 900, as shown in FIG. 9, may include one particular set of blocks or actions associated with particular components or modules, these blocks or actions may be associated with different components or modules than the particular component or module illustrated here.

Figure 10:
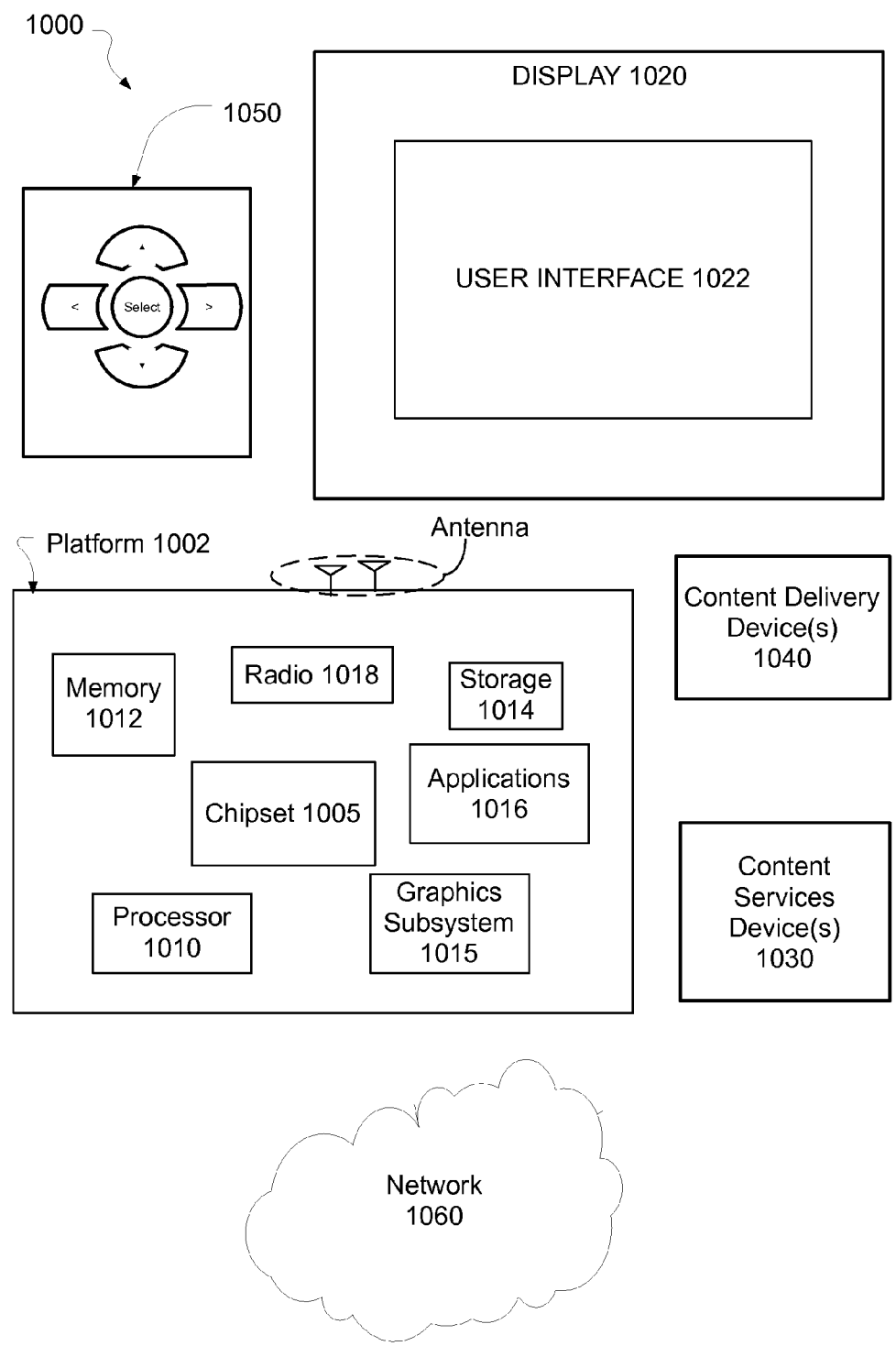
FIG. 10 is an illustrative diagram of another example system.

Referring to FIG. 10, an example system 1000 in accordance with the present disclosure operates one or more aspects of the image processing system described herein. It will be understood from the nature of the system components described below that such components may be associated with, or used to operate, certain part or parts of the image processing system described above. In various implementations, system 1000 may be a media system although system 1000 is not limited to this context. For example, system 1000 may be incorporated into a digital still camera, digital video camera, mobile device with camera or video functions such as an imaging phone, webcam, personal computer (PC), laptop computer, ultra-laptop computer, tablet with multiple cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, storage 1014, graphics subsystem 1015, applications 1016 and/or radio 1018. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, Display Port, wireless HDMI, and/or wireless HD compliant techniques. Graphics subsystem 1015 may be integrated into processor 1010 or chipset 1005. In some implementations, graphics subsystem 1015 may be a stand-alone card communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, tablet, Internet enabled devices or appliance capable of delivering digital information and/or content, and any other similar device capable of unidirectionally or bidirectionally communicating content between content providers and platform 1002 and/display 1020, via network 1060 or directly. It will be appreciated that the content may be communicated unidirectionally and/or bidirectionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of controller 1050 may be used to interact with user interface 1022, for example. In implementations, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1050 may be replicated on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In implementations, controller 1050 may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various implementations, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various implementations, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 10.

Figure 11:
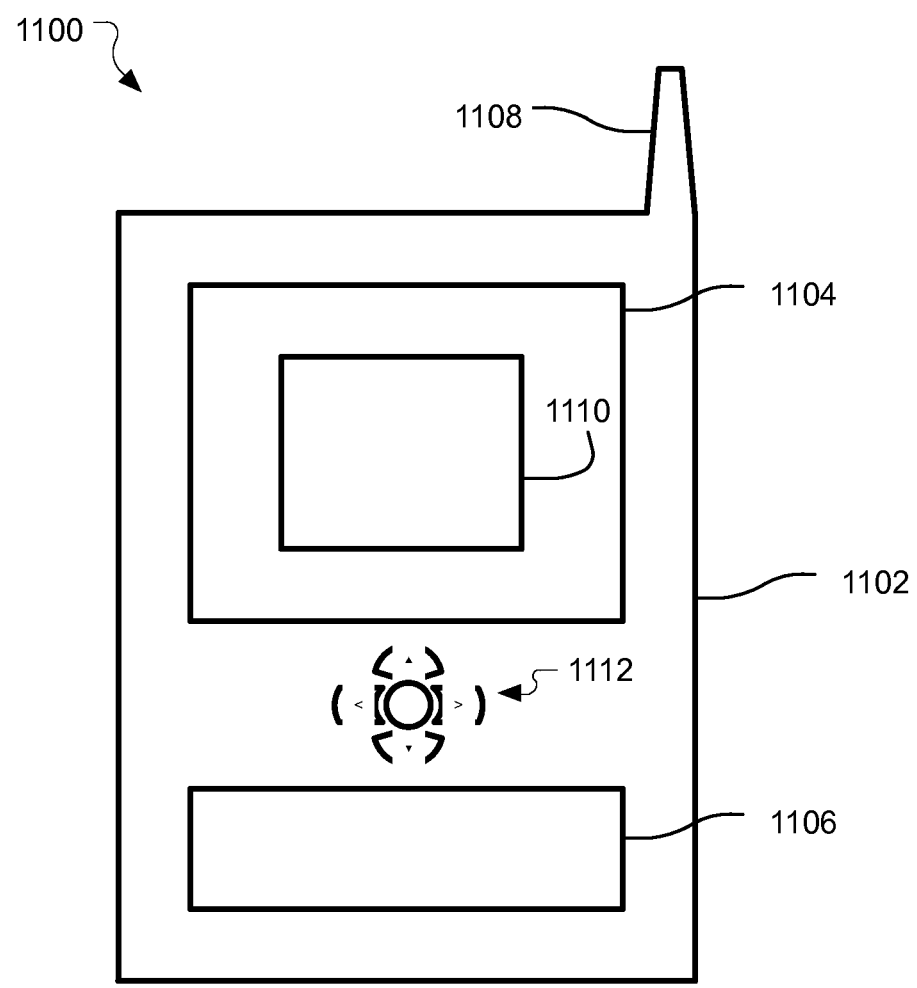
FIG. 11 illustrates another example device, all arranged in accordance with at least some implementations of the present disclosure.

Referring to FIG. 11, a small form factor device 1100 is one example of the varying physical styles or form factors in which system 900 and/or 1000 may be embodied. By this approach, device 1100 may be implemented as a mobile computing device having wireless capabilities and multiple cameras. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 11, device 1100 may include a housing 1102, a display 1104 including a screen 1110, an input/output (I/O) device 1106, and an antenna 1108. Device 1100 also may include navigation features 1112. Display 1104 may include any suitable display unit for displaying information appropriate for a mobile computing device. I/O device 1106 may include any suitable I/O device for entering information into a mobile computing device. Examples for I/O device 1106 may include an alphanumeric keyboard, a numeric keypad, a touch pad, input keys, buttons, switches, rocker switches, microphones, speakers, voice recognition device and software, and so forth. Information also may be entered into device 1100 by way of microphone (not shown). Such information may be digitized by a voice recognition device (not shown). The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one implementation, a computer implemented method of sub-pixel accurate 3D measurement using multiple images, comprises selecting at least one first point to refine to a sub-pixel accurate location and from at least one of multiple images of the same scene; determining a region of interest patch on the one image and including the first point, and comprising biasing the region of interest patch toward at least a second point on the one image; and determining sub-pixel 3D coordinates associated with the first point by, at least in part, aligning the biased region of interest patch with at least one other region of interest patch of a corresponding point that matches the first point and disposed on another of the images.

By some variations of the method, the method also may comprise biasing the region of interest patch of at least the first point along a straight line from the first point to the second point, wherein the bias is in both a horizontal and vertical direction on the one image; biasing the region of interest patch of at least the first point away from a side of the first point that is opposite a side of the first point having the second point; permitting selection of the first and second points on one of the images to initiate measurement of the distance between the two points; forming a bias factor based on a ratio of the distance between the first and second points relative to the size of the image, and to be used to determine the position of the biased region of interest patch on the one image; forming a bias value based on the bias factor, a default radius of the region of interest patch, and a threshold that indicates whether a straight line from the first point to the second point is close to being horizontal or vertical or neither; forming a dimension of the region of interest patch and from the first point to an edge of the region of interest patch based on the bias value and a scale value that is a maximum available size of the region of interest patch; using adjustment values in a calculation with whole pixel coordinates of the first point to refine the coordinates of the corresponding point to sub-pixel accuracy; and using the calculation with the adjustment values in a transform matrix and the whole pixel point coordinates of the first point to obtain sub-pixel coordinates of the corresponding point; wherein the calculation comprises using the dimensions from the first point to the edges of the biased region of interest patch; and wherein the adjustment values include a scale value and a shift displacement value for the biased region of interest patch.

The method also may comprise forming a biased region of interest patch for the corresponding point for comparison to the biased region of interest point of the first point; determining a final sub-pixel disparity of the first point at least by using the sub-pixel accuracy of the corresponding point and from image to image; determining three dimensional sub-pixel coordinates for the points based on the final sub-pixel disparities; determining a final sub-pixel disparity of the second point based on a biased region of interest patch at the second point and a point corresponding to the second point on the other image, and determining three-dimensional sub-pixel coordinates of the second point based on the final sub-pixel disparity of the second point; measuring a distance between the first and second points based on the three-dimensional sub-pixel coordinates; and selecting a final disparity of a plurality of available disparities each associated with a comparison of a different image and corresponding point and the image of the first point, and comprising: determining an error as a comparison of the pixel values within a biased region of interest patch at an image with a corresponding point and the biased region of interest patch at the first point, and comprising determining an error both before and after the adjustment values are applied to the biased region of interest patch at the corresponding point; determining a gain which is the difference of the before and after errors for each comparison of patches between the image of a corresponding point and the image of the first point; and selecting the final disparity for the first point based on the disparity of the image with the gain that meets a criteria.

By another implementation, a computer-implemented system of sub-pixel accuracy 3D measurement using multiple images comprises a display; at least one processor communicatively coupled to the display; at least one memory communicatively coupled to at least one processor; and a sub-pixel point refinement unit operated by the processor and to: select at least one first point to refine to a 3D sub-pixel accurate location and from at least one of multiple images of the same scene; determine a region of interest patch on the one image and including the first point, and comprising biasing the region of interest patch toward at least a second point on the one image; and determine sub-pixel coordinates associated with at least the first point by, at least in part, aligning the biased region of interest patch with at least one other region of interest patch of a corresponding point that matches the first point and disposed on another of the images.

By some variations of the system, the sub-pixel point refinement unit also is to bias the region of interest patch of at least the first point along a straight line from the first point to the second point, wherein the bias is in both a horizontal and vertical direction on the one image; bias the region of interest patch of at least the first point away from a side of the first point that is opposite a side of the first point having the second point; permit selection of the first and second points on one of the images to initiate measurement of the distance between the two points; form a bias factor based on a ratio of the distance between the first and second points relative to the size of the image, and to be used to determine the position of the biased region of interest patch on the one image; form a bias value based on the bias factor, a default radius of the region of interest patch, and a threshold that indicates whether a straight line from the first point to the second point is close to being horizontal or vertical or neither; form a dimension of the region of interest patch and from the first point to an edge of the region of interest patch based on the bias value and a scale value that is a maximum available size of the region of interest patch; use adjustment values in a calculation with whole pixel coordinates of the first point to refine the coordinates of the corresponding point to sub-pixel accuracy; and use the calculation with the adjustment values in a transform matrix and the whole pixel point coordinates of the first point to obtain sub-pixel coordinates of the corresponding point; wherein the calculation comprises using the dimensions from the first point to the edges of the biased region of interest patch; and wherein the adjustment values include a scale value and a shift displacement value for the biased region of interest patch.

The unit may also form a biased region of interest patch for the corresponding point for comparison to the biased region of interest point of the first point; determine a final sub-pixel disparity of the first point at least by using the sub-pixel accuracy of the corresponding point and from image to image; determine three dimensional sub-pixel coordinates for the points based on the final sub-pixel disparities; determine a final sub-pixel disparity of the second point based on a biased region of interest patch at the second point and a point corresponding to the second point on the other image, and determining three-dimensional sub-pixel coordinates of the second point based on the final sub-pixel disparity of the second point; measure a distance between the first and second points based on the three-dimensional sub-pixel coordinates; and select a final disparity of a plurality of available disparities each associated with a comparison of a different image and corresponding point and the image of the first point, and comprising: determine an error as a comparison of the pixel values within a biased region of interest patch at an image with a corresponding point and the biased region of interest patch at the first point, and comprising determining an error both before and after the adjustment values are applied to the biased region of interest patch at the corresponding point; determine a gain which is the difference of the before and after errors for each comparison of patches between the image of a corresponding point and the image of the first point; and select the final disparity for the first point based on the disparity of the image with the gain that meets a criteria.

By a further implementation, a computer-readable medium having stored thereon instructions that when executed cause a computing device to: select at least one first point to refine to a 3D sub-pixel accurate location and from at least one of multiple images of the same scene; determine a region of interest patch on the one image and including the first point, and comprising biasing the region of interest patch toward at least a second point on the one image; and determine sub-pixel coordinates associated with at least the first point by, at least in part, aligning the biased region of interest patch with at least one other region of interest patch of a corresponding point that matches the first point and disposed on another of the images.

By some variations of the medium, the instructions also may cause the computing device to bias the region of interest patch of at least the first point along a straight line from the first point to the second point, wherein the bias is in both a horizontal and vertical direction on the one image; bias the region of interest patch of at least the first point away from a side of the first point that is opposite a side of the first point having the second point; permit selection of the first and second points on one of the images to initiate measurement of the distance between the two points; form a bias factor based on a ratio of the distance between the first and second points relative to the size of the image, and to be used to determine the position of the biased region of interest patch on the one image; form a bias value based on the bias factor, a default radius of the region of interest patch, and a threshold that indicates whether a straight line from the first point to the second point is close to being horizontal or vertical or neither; form a dimension of the region of interest patch and from the first point to an edge of the region of interest patch based on the bias value and a scale value that is a maximum available size of the region of interest patch; use adjustment values in a calculation with whole pixel coordinates of the first point to refine the coordinates of the corresponding point to sub-pixel accuracy; and use the calculation with the adjustment values in a transform matrix and the whole pixel point coordinates of the first point to obtain sub-pixel coordinates of the corresponding point; wherein the calculation comprises using the dimensions from the first point to the edges of the biased region of interest patch; and wherein the adjustment values include a scale value and a shift displacement value for the biased region of interest patch.

The instructions also may cause the computing device to form a biased region of interest patch for the corresponding point for comparison to the biased region of interest point of the first point; determine a final sub-pixel disparity of the first point at least by using the sub-pixel accuracy of the corresponding point and from image to image; determine three dimensional sub-pixel coordinates for the points based on the final sub-pixel disparities; determine a final sub-pixel disparity of the second point based on a biased region of interest patch at the second point and a point corresponding to the second point on the other image, and determining three-dimensional sub-pixel coordinates of the second point based on the final sub-pixel disparity of the second point; measure a distance between the first and second points based on the three-dimensional sub-pixel coordinates; and select a final disparity of a plurality of available disparities each associated with a comparison of a different image and corresponding point and the image of the first point, and comprising: determine an error as a comparison of the pixel values within a biased region of interest patch at an image with a corresponding point and the biased region of interest patch at the first point, and comprising determining an error both before and after the adjustment values are applied to the biased region of interest patch at the corresponding point; determine a gain which is the difference of the before and after errors for each comparison of patches between the image of a corresponding point and the image of the first point; and select the final disparity for the first point based on the disparity of the image with the gain that meets a criteria.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A method of sub-pixel accurate 3D measurement for at least one distance measuring camera, comprising:
   capturing a first image of a scene by the at least one camera and comprising providing pixel data of the first image;
   identifying, by at least one processor of the at least one camera, a first point and a second point on the pixel data of the first image of the scene in order to measure a distance between 3D locations associated with the first and second points, wherein the first and second points represent different locations on the scene;
   capturing a second image of the scene by the at least one camera and comprising providing pixel data of the second image;
   matching, by at least one processor of the at least one camera, a first corresponding point of the second image to the first point of the first image, wherein the first corresponding point and the first point represent the same physical location on the scene, and matching a second corresponding point of the second image to the second point of the first image, wherein the second corresponding point and the second point represent the same physical location on the scene;
   determining, by at least one processor of the at least one camera, a biased region of interest patch having multiple pixels near the first point on the first image, and including the first point, and comprising biasing the biased region of interest patch toward the second point on the first image so that the first point is not in the spatial center of the biased region of interest patch;
   determining, by at least one processor of the at least one camera, a region of interest patch having multiple pixels near the first corresponding point on the second image; and
   determining, by at least one processor of the at least one camera, sub-pixel 3D coordinates associated with the first point by, at least in part, aligning the biased region of interest patch with the region of interest patch of the first corresponding point; and
   using the sub-pixel 3D coordinates to determine a 3D distance between a 3D location associated with the first point and a 3D location associated with the second point.

2. The method of claim 1 comprising biasing the biased region of interest patch of the first point along a straight line from the first point to the second point.

3. The method of claim 2 comprising biasing the biased region of interest patch of the first point so that more pixels within the region of interest patch are between the first and second point along the straight line than an amount of pixels of the biased region of interest patch and along the straight line that are not between the first and second points.

4. The method of claim 1 comprising permitting selection of the first and second points on the first image to initiate measurement of the distance between the first and second points, the permitting comprising providing a screen with an image of the scene and an interface permitting a user to select the first and second points on the screen.

5. The method of claim 1 wherein the biasing is in both a horizontal and a vertical direction on the first image.

6. The method of claim 1 comprising forming a bias factor based on a ratio of a 2D pixel distance between the first and second points relative to the size of the first image, and to be used to determine the position of the biased region of interest patch on the first image.

7. The method of claim 6 comprising forming a bias value based on the bias factor, a default radius of the region of interest patch, and a threshold that indicates whether a straight line from the first point to the second point is close to being horizontal or vertical or neither.

8. The method of claim 7 comprising forming a dimension of the biased region of interest patch and from the first point to an edge of the biased region of interest patch based on the bias value and a scale value that is a maximum available size of the biased region of interest patch.

9. The method of claim 1 comprising using adjustment values in a calculation with whole pixel coordinates of the first point to refine the coordinates of the corresponding point to sub-pixel accuracy.

10. The method of claim 9 comprising using the calculation with the adjustment values in a transform matrix and the whole pixel point coordinates of the first point to obtain sub-pixel coordinates of the corresponding point.

11. The method of claim 10 wherein the calculation comprises using distances from the first point to edges of the biased region of interest patch.

12. The method of 9 wherein the adjustment values include a scale value and a shift displacement value for the biased region of interest patch.

13. The method of claim 1 comprising:
biasing the region of interest patch of the first corresponding point toward the second corresponding point; and
comparing the biased region of interest patch of the first point to the biased region of interest patch of the first corresponding point.

14. The method of claim 13 comprising determining a final sub-pixel disparity of the first point at least by using sub-pixel accuracy of the first corresponding point.

15. The method of claim 14 comprising determining three dimensional sub-pixel coordinates for the first point based on the final sub-pixel disparity.

16. The method of claim 15 comprising determining a final sub-pixel disparity of the second point based on a biased region of interest patch at the second point and at the second corresponding point on the second image, and determining three-dimensional sub-pixel coordinates of the second point based on the final sub-pixel disparity of the second point.

17. The method of claim 16 comprising measuring a distance between the first and second points based on the three-dimensional sub-pixel coordinates.

18. The method of claim 1 comprising selecting a final disparity of a plurality of available disparities each associated with a comparison of a different image having a corresponding point that corresponds with the first point, and comparison to the first image of the first point, and comprising:
determining an error as a comparison of the pixel values within a biased region of interest patch at an image with the corresponding point and the biased region of interest patch at the first point, and comprising determining an error both before and after adjustment values are applied to the biased region of interest patch at the corresponding point;
determining a gain which is the difference of the before and after errors for each comparison of region of interest patches between the image of a corresponding point and the image of the first point; and
selecting the final disparity for the first point based on the disparity of the image with the gain that meets a criteria.

19. The method of claim 1 comprising:
forming a separate biased region of interest patch about each of the first, second, first corresponding, and second corresponding points, each biased region of interest patch being biased toward the other point of the first or second point, or first or second corresponding point, on the same image.

20. At least one distance measuring camera, comprising:
a sensor component to capture at least a first and second image of a scene wherein each image is taken from the at least one camera at a different position relative to the scene;
a display;
at least one processor of the at least one camera communicatively coupled to the display;
at least one memory communicatively coupled to the at least one processor;
the at least one processor of the at least one camera being operated to:
identify a first point and a second point on the first image of the scene in order to measure a distance between 3D locations associated with the first and second points, wherein the first and second points represent different locations on the scene, and
identify a first corresponding point of the second image that corresponds to the first point of the first image, wherein the first corresponding point and the first point represent the same physical location on the scene, and identify a second corresponding point of the second image that corresponds to the second point of the first image, wherein the second corresponding point and the second point represent the same physical location on the scene;
a sub-pixel point refinement unit operated by the at least one processor of the at least one camera and to:
determine a biased region of interest patch having multiple pixels near the first point on the first image, and including the first point, and comprising biasing the biased region of interest patch toward the second point on the first image so that the first point is not in the spatial center of the biased region of interest patch;
determine a region of interest patch having multiple pixels near the first corresponding point on the second image; and
determine sub-pixel 3D coordinates associated with the first point by, at least in part, aligning the biased region of interest patch with the region of interest patch of the first corresponding point; and
a distance unit to use the sub-pixel 3D coordinates to determine a 3D distance between a 3D location associated with the first point and a 3D location associated with the second point.

21. The system of claim 20 wherein the sub-pixel point refinement unit is to bias the biased region of interest patch of the first point along a straight line from the first point to the second point.

22. The system of claim 20 wherein the sub-pixel point refinement unit is to bias the biased region of interest patch of the first point so that more pixels within the biased region of interest patch are between the first and second point along the straight line than an amount of pixels of the biased region of interest patch and along the straight line that are not between the first and second points.

23. The system of claim 20 wherein the sub-pixel point refinement unit is to:
bias the biased region of interest patch of the first point along a straight line from the first point to the second point, wherein the bias is in both a horizontal and vertical direction on the first image;
bias the region of interest patch of the first point so that more pixels within the region of interest patch are between the first and second point along the straight line than the amount of pixels of the biased region of interest patch and along the straight line that are not between the first and second points;
permit selection of the first and second points on the first image to initiate measurement of the distance between the two points;
form a bias factor based on a ratio of a 2D pixel distance between the first and second points relative to the size of the first image, and to be used to determine the position of the biased region of interest patch on the first image;
form a bias value based on the bias factor, a default radius of the region of interest patch, and a threshold that indicates whether a straight line from the first point to the second point is close to being horizontal or vertical or neither;
form a dimension of the region of interest patch and from the first point to an edge of the biased region of interest patch based on the bias value and a scale value that is a maximum available size of the biased region of interest patch;

use adjustment values in a calculation with whole pixel coordinates of the first point to refine the coordinates of the corresponding point to sub-pixel accuracy;

use the calculation with the adjustment values in a transform matrix and the whole pixel point coordinates of the first point to obtain sub-pixel coordinates of the corresponding point; wherein the calculation comprises using the dimensions from the first point to the edges of the biased region of interest patch; and wherein the adjustment values include a scale value and a shift displacement value for the biased region of interest patch;

bias the region of interest patch of the first corresponding point toward the second corresponding point; and compare the biased region of interest patch of the first point to the biased region of interest patch of the first corresponding point;

determine a final sub-pixel disparity of the first point at least by using sub-pixel accuracy of the first corresponding point;

determine three dimensional sub-pixel coordinates for the first point based on the final sub-pixel disparity;

determine a final sub-pixel disparity of the second point based on a biased region of interest patch at the second point and at a the second corresponding point on the second image, and determining three-dimensional sub-pixel coordinates of the second point based on the final sub-pixel disparity of the second point;

measure a distance between the first and second points based on the three-dimensional sub-pixel coordinates; and select a final disparity of a plurality of available disparities each associated with a comparison of a different image having a corresponding point that corresponds with the first point, and comparison to the first image of the first point, and comprising:

determine an error as a comparison of the pixel values within a biased region of interest patch at an image with the corresponding point and the biased region of interest patch at the first point, and comprising determining an error both before and after adjustment values are applied to the biased region of interest patch at the corresponding point;

determine a gain which is the difference of the before and after errors for each comparison of region of interest patches between the image of a corresponding point and the image of the first point; and select the final disparity for the first point based on the disparity of the image with the gain that meets a criteria.

24. A non-transitory computer-readable medium having stored thereon instructions that when executed cause a computing device of at least one distance measuring camera to operate by:

capturing a first image of a scene by the at least one camera and comprising providing pixel data of the first image;

identifying, by at least one processor of the at least one camera, a first point and a second point on the pixel data of the first image of the scene in order to measure a distance between 3D locations associated with the first and second points, wherein the first and second points represent different locations on the scene;

capturing a second image of the scene by the at least one camera and comprising providing pixel data of the second image;

matching, by at least one processor of the at least one camera, a first corresponding point of the second image to the first point of the first image, wherein the first corresponding point and the first point represent the same physical location on the scene, and matching a second corresponding point of the second image to the second point of the first image, wherein the second corresponding point and the second point represent the same physical location on the scene;

determining, by at least one processor of the at least one camera, a biased region of interest patch having multiple pixels near the first point on the first image, and including the first point, and comprising biasing the biased region of interest patch toward the second point on the first image so that the first point is not in the spatial center of the biased region of interest patch;

determining, by at least one processor of the at least one camera, a region of interest patch having multiple pixels near the first corresponding point on the second image; and determining, by at least one processor of the at least one camera, sub-pixel 3D coordinates associated with the first point by, at least in part, aligning the biased region of interest patch with the region of interest patch of the first corresponding point; and using the sub-pixel 3D coordinates to determine a 3D distance between a 3D location associated with the first point and a 3D location associated with the second point.

25. The non-transitory computer medium of claim 24 wherein the instructions cause the computing device to:

bias the biased region of interest patch of the first point along a straight line from the first point to the second point, wherein the bias is in both a horizontal and vertical direction on the first image;

bias the region of interest patch of the first point so that more pixels within the region of interest patch are between the first and second point along the straight line than an amount of pixels of the biased region of interest patch and along the straight line that are not between the first and second points;

permit selection of the first and second points on the first image to initiate measurement of the distance between the two points;

form a bias factor based on a ratio of a 2D pixel distance between the first and second points relative to the size of the first image, and to be used to determine the position of the biased region of interest patch on the first image;

form a bias value based on the bias factor, a default radius of the region of interest patch, and a threshold that indicates whether a straight line from the first point to the second point is close to being horizontal or vertical or neither;

form a dimension of the region of interest patch and from the first point to an edge of the biased region of interest patch based on the bias value and a scale value that is a maximum available size of the biased region of interest patch;

use adjustment values in a calculation with whole pixel coordinates of the first point to refine the coordinates of the corresponding point to sub-pixel accuracy;

use the calculation with the adjustment values in a transform matrix and the whole pixel point coordinates of the first point to obtain sub-pixel coordinates of the corresponding point;

wherein the calculation comprises using the dimensions from the first point to the edges of the biased region of interest patch; and wherein the adjustment values include a scale value and a shift displacement value for the biased region of interest patch;

bias the region of interest patch of the first corresponding point toward the second corresponding point; and compare the biased region of interest patch of the first point to the biased region of interest patch of the first corresponding point;

determine a final sub-pixel disparity of the first point at least by using sub-pixel accuracy of the first corresponding point;

determine three dimensional sub-pixel coordinates for the first point based on the final sub-pixel disparity;

determine a final sub-pixel disparity of the second point based on a biased region of interest patch at the second point and at the second corresponding point on the second image, and determining three-dimensional sub-pixel coordinates of the second point based on the final sub-pixel disparity of the second point;

measure a distance between the first and second points based on the three-dimensional sub-pixel coordinates; and select a final disparity of a plurality of available disparities each associated with a comparison of a different image having a corresponding point that corresponds with the first point, and comparison to the first image of the first point, and comprising:

determine an error as a comparison of the pixel values within a biased region of interest patch at an image with the corresponding point and the biased region of interest patch at the first point, and comprising determining an error both before and after adjustment values are applied to the biased region of interest patch at the corresponding point;

determine a gain which is the difference of the before and after errors for each comparison of region of interest patches between the image of a corresponding point and the image of the first point; and select the final disparity for the first point based on the disparity of the image with the gain that meets a criteria.

* * * * *